United States Patent [19]

Kohtoku et al.

[11] Patent Number: 4,812,298

[45] Date of Patent: Mar. 14, 1989

[54] METHOD FOR PRODUCING SIALON POWDERS

[75] Inventors: Yasuhiko Kohtoku; Teturo Kunisawa; Takuji Takahashi, all of Ube, Japan

[73] Assignee: Ube Industries, Ltd., Yamaguchi, Japan

[21] Appl. No.: 910,601

[22] Filed: Sep. 23, 1986

[30] Foreign Application Priority Data

Sep. 27, 1985 [JP] Japan .................. 60-21267

[51] Int. Cl.$^4$ .................................. C01B 33/26
[52] U.S. Cl. ...................... 423/327; 501/98; 264/65
[58] Field of Search .............. 501/98, 96, 97; 423/327; 264/65, 66

[56] References Cited

U.S. PATENT DOCUMENTS

| | | | |
|---|---|---|---|
| 3,991,148 | 11/1976 | Lumby et al. | 501/98 V |
| 3,991,166 | 11/1970 | Jack et al. | 501/98 X |
| 4,127,416 | 11/1978 | Lumby et al. | 501/98 X |
| 4,147,759 | 4/1979 | Demit | 501/97 X |
| 4,323,323 | 4/1982 | Lumby et al. | 501/98 |
| 4,360,506 | 11/1982 | Paris et al. | 501/98 X |
| 4,438,051 | 3/1984 | Mitomo et al. | 501/98 X |
| 4,499,193 | 2/1985 | Phelps et al. | 501/98 |
| 4,506,020 | 3/1985 | Butler | 501/97 |
| 4,552,711 | 11/1985 | Raj et al. | 501/97 X |

FOREIGN PATENT DOCUMENTS

| | | | |
|---|---|---|---|
| 56-78472 | 6/1981 | Japan | 501/98 |
| 59-199581 | 11/1984 | Japan | 501/98 |
| 60-191064 | 9/1985 | Japan | 501/98 |

*Primary Examiner*—William R. Dixon, Jr.
*Assistant Examiner*—Ann M. Knab
*Attorney, Agent, or Firm*—Austin R. Miller

[57] ABSTRACT

Uniform sialon powders having a sharp particle size distribution are obtained by mixing (i) amorphous silicon nitride powders, (ii) an oxygen-containing compound of silicon or/and aluminum, and (iii) aluminum metal, aluminum nitride and/or silicon, and then heating the resultant mixture at 1300° to 1800° C. in an atmosphere containing nitrogen.

8 Claims, No Drawings

METHOD FOR PRODUCING SIALON POWDERS

BACKGROUND OF THE INVENTION

1. Field of the Invention

This invention relates to a method for producing sialon powders, particularly β-sialon powders.

2. Description of the Related Art

β-sialon is a substitution type solid solution in which some silicon sites are occupied by aluminum and some nitrogen sites are occupied by oxygen in a β-silicon nitride structure. The term sialon refers comprehensively to compounds and/or solid solutions composed of the Si,Al,O and N elements, but usually the term "sialon" merely refers to β-sialon, which is represented by the formula $Si_{6-z}Al_zO_zN_{8-z}$ (wherein z is a number greater than 0 and not greater than 4.2). In the present specification, sialon means β-sialon unless otherwise specifically noted.

Sialon has a high resistance to oxidation at a high temperature and also an excellent corrosion resistance to molten metals or slag, and therefore, sialon powders are useful as the starting material for various refractory materials. Also, sialon ceramics obtained by sintering sialon powders have hiqh strength and hardness at a high temperature and are excellent for use in engine parts, gas turbine parts or cutting tools.

As a method for producing sialon powders, for example, the following methods are known.

(1) The method in which carbon is added to a clay mineral such as kaolinite, etc., which is a naturally occurring silica-alumina type mineral, and the mixture is subjected to carbothermal reduction and nitridation by heating in a nitrogen gas stream [Journal of Ceramic Society of Japan, 91, 442 (1983)].

(2) The method in which aluminum metal is added to a silica source such as shirasu, etc., and the mixture is heated in a nitrogen gas stream.

(3) The method in which a co-precipitate of aluminum hydroxide and silica gel is heated in an ammonia atmosphere [American Ceramic Society Bulletin, 58, 191 (1979)].

(4) The method in which carbon powder is uniformly dispersed in a silica-alumina mixture obtained by hydrolysis of a powder mixture of silicon alkoxide and aluminum alkoxide, and the dispersion is heated in a nitrogen gas atmosphere (Japanese Unexamined Patent Publication (Kokai) No. 60-145902).

The above methods (1) and (2) have a drawback in that a large amount of impurities remain in the sialon powders because natural occurring starting materials are used. The above method (3) has a drawback in that unaltered reactants remain in the sialon powders produced because the reaction is not likely to be completed. According to method (4), fine particle sialon powders having very high purity can be obtained, but there are still drawbacks such that unaltered carbon remains [see Journal of Ceramic Society of Japan, 93, 69 (1985)]or that it is difficult to obtain sialon powders with any desired composition [see Journal of Ceramic Society of Japan, 93, 34 (1985)], and therefore, it is not satisfactory as an industrial production method from the aspect of the starting material and process.

SUMMARY OF THE INVENTION

An object of the present invention is to provide an industrial method for producing fine particule sialon powders having a high purity.

This object and other objects can be accomplished by the present invention by providing a method for producing sialon powders, comprising the steps of: (a) mixing the following components in a composition for a desired sialon: (i) an amorphous silicon nitride powder, (ii) an oxygen-containing compound of silicon and/or aluminum (hereinafter referred as "component (ii)"), and, (iii) aluminum metal, aluminum nitride and/or silicon (hereinafter referred as "component (iii)"); and then (b) heating the resultant mixture at a temperature in a range of 1300° C. to 1800° C. in a nitrogen-containing atmosphere to obtain crystallized sialon powders.

According to the present invention, it is possible to produce sialon powders of any desired z value in the formula $Si_{6-z}Al_zO_zN_{8-z}$ (wherein z is greater than 0 but not greater than 4.2), which have a high purity, are composed of fine particules, and have a sharp particle size distribution. The sialon powders obtained by the present invention have an excellent sinterability, and the sintered products are composed of similiar size grains in which elemental distributions are uniform, when compared with the sintered product obtained by the method of the prior art by sintering a mixture of crystalline silicon nitride powders, alumina powders, and aluminum nitride powders, and thus the present invention provides a highly reliable engineering material.

An amorphous silicon nitride powder is a substance obtained by a known method, for example, by heating the reaction product obtained by reaction between a silicon tetrahalide and ammonia in a liquid phase or gas phase, and is a so-called amorphous powder that does not exhibit a clear diffraction by ordinary X-ray diffraction. Depending on the conditions for the heat treatment of the above reaction product, powders exhibiting slight diffraction by X-ray diffraction may be sometimes obtained, and these powders are also included within the amorphous silicon nitride powders contemplated in the present invention.

Examples of oxygen-containing compounds of silicon may include silica, silica-containing materials, and silica precursors such as silicon alkoxide, but preferably amorphous silica is used. Examples of oxygen-containing compounds of aluminum may include alumina, alumina-containing materials, and alumina precursors such as aluminum hydroxide and aluminum alkoxide. Preferably alumina is used, most preferably, alumina which is not subjected to heat treatment at a high temperature of 1000° C. or higher, such as γ-alumina, is used.

Oxygen-containing compounds of silicon or aluminum are desirably in the form of a powder. Both compounds may be used either individually or in combination.

The metal aluminum, aluminum nitride or silicon is also desirably in the form of a powder. These substances can be used either individually or in combination.

In the present invention, it may be considered that oxygen-containing compounds of silicon or aluminum serve to supply oxygen in sialon, while metal aluminum or silicon, by absorbing nitrogen from the nitrogen gas-containing atmosphere in the course of crystallization, together with the nitrogen based on the amorphous silicon nitride powder, serve to supply and control the nitrogen in sialon.

The proportions of the amorphous silicon nitride powder, the component (ii) and the component (iii) to be formulated may be such that the total silicon, the total aluminum, and the total oxygen in the mixed powders can give the ratio of the three elements in the desired sialon composition.

The method for mixing the amorphous silicon nitride powder, the component (ii), and the component (iii) is not particularly limited, but any of the known methods known, per se, can be employed: For example, the method in which the three components are dry mixed; and the method in which the three components are wet mixed in an inert liquid and the inert liquid is then removed. As the mixing device, a V-shaped blender, ball mill and vibrating ball mill are preferably used. As an alternative method for preparing the mixture of the three components, the method in which the component (ii) and the component (iii) are mixed with a precursor of amorphous silicon nitride powder such as silicon diimide or silicon tetramide to form a dispersion thereof, and the dispersion is subjected to heat treatment, may be employed. In the above various preparation methods, amorphous silicon nitride powders or precursors thereof are very sensitive to oxygen and water and, therefore, must be handled under a controlled inert atmosphere.

The mixture of amorphous silicon nitride, the component (ii), and the component (iii) is heated under a nitrogen gas-containing atmosphere to obtain crystallized sialon powders.

Examples of the nitrogen gas-containing atmosphere are nitrogen gas, atmosphere of ammonia, and an argon atmosphere containing nitrogen and/or ammonia gases.

The heating temperature is in a range of 1300° to 1800° C. If the heating temperature is lower than 1300° C., crystallization will take a long time, which is disadvantageous for industrial application. On the other hand, if the heating temperature exceeds 1800° C., scattering of the silicon monooxide, etc., will occur, and thus powders deviated from the desired sialon composition may be undesirably formed. The heating time is generally 20 hours or shorter.

The heating furnace to be used during heating of the mixed powders is not particularly limited, but, for example, there may be employed a batch system furnace according to a high frequency induction heating system or resistor heating system, a rotary furnace, a fluidized furnace or a furnace.

The sialon powders obtained according to the present invention are powders which are fine and have a sharp particle size distribution, with the size of primary particles being in a range of 0.2 to 2 $\mu$m.

The present invention is now described by referring to the following Examples.

EXAMPLE 1

127.6 g of amorphous silicon nitride powders obtained by heat treating silicon diimide at 1200° C., 38.8 g of $\gamma$-alumina (specific surface area: 100 m$^2$/g) and 16.0 g of metal aluminum powders (specific surface area: 0.3 m$^2$/g) were mixed in a vibrating mill in a nitrogen gas atmosphere for 1 hour. The powdery mixture was placed in a crucible made of carbon and set in a high frequency induction furnace and crystallized by heating according to the temperature elevation schedule of 1 hour from room temperature to 1200° C., 4 hours from 1200° C. to 1400° C., and a further 2 hours from 1400° C. to 1600° C.

When the powders obtained were examined, the sizes of the primary particles were regularly 0.3 to 0.6 $\mu$m, and were confirmed by X-ray diffraction to be $\beta$-sialon. Analytical values of the respective elements are shown in Table 1, from which it can be seen that the sialon powder with the desired composition was obtained. Impurities contained were 180 ppm of iron and 200 ppm of calcium.

EXAMPLE 2

The same procedure as in Example 1 was repeated except that the composition of the starting material mixture was changed as shown in Table 1. The primary particle sizes of the powders obtained were found to be 0.4 to 0.7 $\mu$m, and were confirmed by X-ray diffraction to be $\beta$-sialon. Analytical values of the respective elements are shown in Table 1.

EXAMPLE 3

The same procedure as in Example 1 was repeated except that the formulated proportions of the starting material mixture were changed as shown in Table 1, and further the temperature elevation schedule for crystallization was changed to 1 hour from room temperature to 1200° C., 6.7 hours from 1200° C. to 1400° C., and 3 hours from 1400° C. to 1700° C. The primary particle sizes of the powders obtained were found to be 0.2 to 0.5 $\mu$m, and were confirmed by X-ray diffraction to be $\beta$-sialon. The analytical values of the respective elements are shown in Table 1.

TABLE 1

| | | Amount of starting materials used (g) | | | Composition of sialon produced (wt %) | | | | | | | |
|---|---|---|---|---|---|---|---|---|---|---|---|---|
| | | Amorphous | | | Found | | | | Calcd. | | | |
| Example | Target z value | silicon nitride | $\gamma$-Alumina | Al | Si | Al | O | N | Si | Al | O | N |
| 1 | 2 | 127.6 | 38.8 | 16.0 | 38.9 | 18.7 | 12.1 | 30.3 | 39.7 | 19.1 | 11.3 | 29.8 |
| 2 | 3 | 82.6 | 51.1 | 19.0 | 28.0 | 27.3 | 19.3 | 25.4 | 29.7 | 28.7 | 17.0 | 24.7 |
| 3 | 0.96 | 137.5 | 11.8 | 9.0 | 49.8 | 8.6 | 6.3 | 35.3 | 50.2 | 9.2 | 5.5 | 35.1 |

EXAMPLE 4

In the same manner as in Example 1, 116.7 g of amorphous silicon nitride powder, 16.8 g of silica gel heat treated at 300° C. (specific surface area: 320 m$^2$/g) and 15.1 g of metal aluminum were mixed by a vibrating mill. This composition aimed at a sialon with z=1. The powdery mixture was heated as in Example 3. The resultant powders were $\beta$-sialon powder having primary particle sizes of 0.2 to 0.5 $\mu$m. The analytical values (wt. %) of the respective elements of this powder were found to be as follows.

|  | Silicon | Aluminum | Oxygen | Nitrogen |
|---|---|---|---|---|
| Found | 49.0 | 9.6 | 5.9 | 35.5 |
| Calcd. | 49.8 | 9.6 | 5.7 | 34.9 |

EXAMPLE 5

In the same manner as in Example 1, 198.1 g of amorphous silicon nitride powder, 29.8 g of silicon powder, 21.3 g of γ-alumina and 16.1 g of metal aluminum were mixed by a vibrating mill. This mixture was heated in the same manner as in Example 1. The powders obtained were β-sialon powder having primary particle sizes of 0.5 to 1.0 μm. The analytical values (wt. %) of the respective elements of the powders were found to be as follows.

|  | Silicon | Aluminum | Oxygen | Nitrogen |
|---|---|---|---|---|
| Found | 49.7 | 9.9 | 5.8 | 34.6 |
| Calcd. | 49.8 | 9.6 | 5.7 | 34.9 |

EXAMPLE 6

The same procedure as in Example 1 was repeated except for using 24.3 g of aluminum nitride in place of metal aluminum powder. The resultant powders were β-sialon powder having primary particle sizes of 0.3 to 0.6 μm. The Analytical values (wt. %) of the respective elements of this powder were found to be as follows.

|  | Silicon | Aluminum | Oxygen | Nitrogen |
|---|---|---|---|---|
| Found | 39.6 | 18.5 | 14.5 | 27.4 |
| Calcd. | 39.7 | 19.1 | 11.3 | 29.8 |

We claim:

1. A method for producing a crystalline sialon powder, comprising the steps of:
   (a) mixing the following components in a composition for a desired sialon:
   (i) an amorphous silicon nitride powder,
   (ii) an oxygen-containing compound of silicon and/or aluminum, and
   (iii) aluminum metal, aluminum nitride and/or silicon;
   said components being selected in kind and in amount to produce a sialon of the formula $Si_{6-z}Al_zO_zN_{8-z}$ where Z is a number greater than 0 and up to 4.2, and then
   (b) heating the resultant mixture at a temperature in a range of 1300° C. to 1800° C. in a nitrogen-containing atmosphere to obtain crystallized sialon powder having primary particles in the range of 0.2 to 2 μm.

2. A method according to claim 1, wherein said amorphous silicon nitride powder is produced by reacting silicon tetrahalide with ammonia and heating the resultant reaction product at a temperature in a range of 300° C. to 1300° C.

3. A method according to claim 1, wherein said oxygen-containing compound of silicon is amorphous silica.

4. A method according to claim 1, wherein said oxygen-containing compound of aluminum is γ-alumina.

5. A method according to claim 1, wherein said oxygen-containing compound of aluminum and/or silicon are in the form of powders.

6. A method according to claim 1, wherein said aluminum metal, aluminum nitride and/or silicon are in the form of powders.

7. A method according to claim 1, wherein said mixture of said components (i), (ii) and (iii) is obtained by heating a mixture of a precursor of said ingredient (i) and said components (ii) and (iii).

8. A method according to claim 1, wherein said nitrogen-containing atmosphere consists of nitrogen, ammonia, or a mixture of argon therewith.

* * * * *